(No Model.)
G. GUILD.
PHOSPHATE SEPARATOR AND DISINTEGRATOR.
No. 506,591. Patented Oct. 10, 1893.
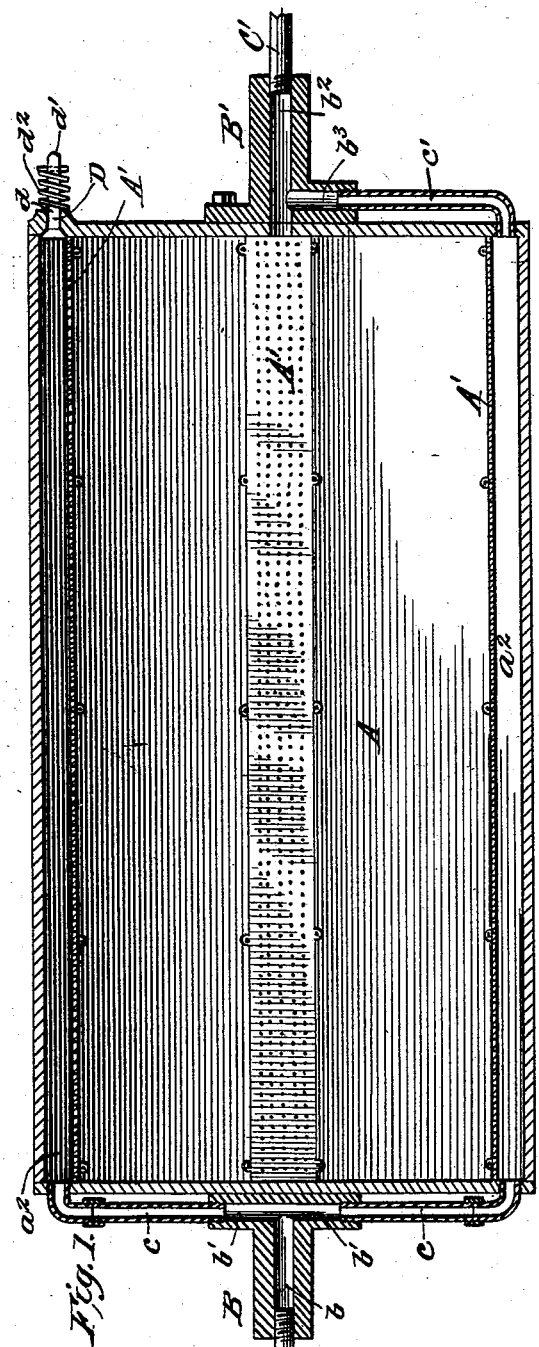
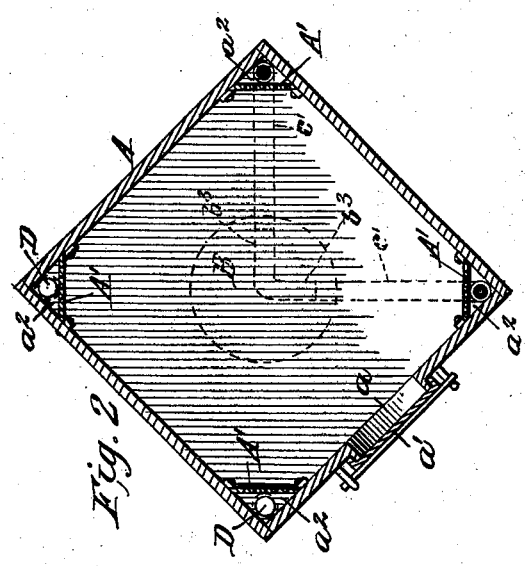
WITNESSES:
Fred G. Dieterich
M. A. Blondel
INVENTOR:
George Guild.
BY Munn & Co
ATTORNEYS

UNITED STATES PATENT OFFICE.

GEORGE GUILD, OF KNOXVILLE, TENNESSEE.

PHOSPHATE SEPARATOR AND DISINTEGRATOR.

SPECIFICATION forming part of Letters Patent No. 506,591, dated October 10, 1893.

Application filed March 21, 1893. Serial No. 467,094. (No model.)

*To all whom it may concern:*

Be it known that I, GEORGE GUILD, residing at Knoxville, Knox county, in the State of Tennessee, have invented a new and useful Improvement in Phosphate Separators and Disintegrators, of which the following is a specification.

This invention relates to an improved method of and device for separating phosphate pebbles or nodules from the phosphatic earth or matrix.

The object of my invention is to provide a method by means of which the phosphate pebbles or nodules can be rapidly separated from the matrix or phosphatic earth; and another object of my invention is to provide a cheap and efficient apparatus for carrying out this method.

With these objects in view my invention consists first, in subjecting the phosphatic earth to blasts of steam, while in a state of agitation, and secondly in certain details of construction and combination of parts whereby this agitation and steaming are accomplished.

In the drawings forming a part of this specification Figure 1 represents by a longitudinal section a view of my apparatus; and Fig. 2 is a view of the same in cross section.

In carrying out my method the phosphatic earth is placed within a suitable receptacle and tightly closed. This body is then revolved for the purpose of agitating the earth and assisting in the separation of the nodules or pebbles from the earth. At the same time that the mass is agitated it is subjected to blasts of steam and as said steam is injected into the mass the earth is disintegrated or blown away from the pebbles leaving them free. The earth and foreign matter which have thus been separated from the phosphate pebbles are then drawn off from said pebbles leaving them free and clean.

In the drawings I have shown an apparatus which I have provided for carrying out my method and in constructing said apparatus I employ a revoluble receptacle A polygonal in cross section, flat at its ends and journaled upon its major axis.

The receptacle A is preferably square in cross section and has an opening $a$ in one of its sides through which the phosphatic earth is introduced into the receptacle portion. This opening $a$ is closed by means of a cover $a'$ while the apparatus is in operation. At each corner of the receptacle A are arranged the perforated plates A' said plates extending the entire length of the receptacle and are secured to the adjacent sides as shown in Fig. 2, thus producing a triangular shaped passage $a^2$ at each corner of the receptacle which extends from one end of the receptacle to the other, as shown in Fig. 1. The receptacle is journaled upon the tubular trunnions B and B'; the trunnion B having a main passage $b$ and forming branch passages $b'$, while the trunnion B' has one main passage $b^2$ extending into the receptacle A, and only two branch passages $b^3 b^3$. A main steam pipe C is connected with the trunnion B and leads into the main passage $b$ and connected also with this trunnion B are the branch steam pipes $c\ c$, said pipes leading from the branch ways $b'$ to the adjacent corner of the receptacle whereby a communication is established between the steam pipe C and the longitudinal corner passages $a^2$, and by means of which steam is injected into the receptacle from every corner of the same, thus subjecting the earthy matter to a series of blasts in opposite directions at the same time it is being agitated by revolution. A steam pipe C' is also connected to the trunnion B' and branch steam pipes $c'\ c'$ connect two of the passages $a^2$ with said pipe C'. The other two passages $a^2$ are provided with blow off valves D D comprising a valve $d$, a stem $d'$ and a spring $d^2$ coiled around said stem. These valves are so arranged that as the receptacle is revolved their stems will contact with a rigid block or arm (not shown) and be pressed in, thus allowing the surplus steam and also the earthy matter which has become separated from the nodules and sifted through the perforated plates to be blown off at the end of the passage. In operation the receptacle is filled with the phosphatic earth or rock, the top closed, and the receptacle revolved. Steam is now admitted through both steam pipes C and C' and by this means it will be seen that steam will be injected into the mass from each corner and also at the center. By this method the mass will soon become separated into the earthy matter and the phosphate nodules or pebbles and the steam becoming condensed will readily dissolve said earthy matter which is thus steamed through the perforated plates and blown off at the ends of the body. Some of the earthy matter will not be so thrown out, but this can easily be removed by disconnecting the steam pipe C' and connecting a water pipe whereby the interior can be thoroughly cleaned and the pebbles left free and clean. The cover is then removed and the pebbles taken out of the separator. The apparatus is now ready for another load of phosphatic earth and the operations are repeated.

Having thus described my invention, what I claim, and desire to secure by Letters Patent, is—

1. The method herein described for separating earth from phosphate nodules or pebbles which consists in agitating the phosphatic earth, and simultaneously subjecting it to blasts of steam, and then straining the filtrate away from the nodules or pebbles substantially as described.

2. In an apparatus of the class described, the combination with a revoluble receptacle having longitudinal passages at its corners which communicate with the interior of the receptacle, the tubular trunnions and the main and branch steam pipes all arranged substantially as shown and described.

3. In an apparatus of the class described the combination with the revoluble receptacle, of the perforated plates arranged at each corner, the tubular trunnions, the main and branch steam pipes and the blow off valves all arranged substantially as described.

4. In an apparatus of the class described the combination with a square receptacle, of the tubular trunnions constructed as described and connected with the opposite ends of the receptacle, the main steam supply pipes, the perforated plates arranged in each corner of the receptacle and the spring actuated blow off cocks all arranged substantially as and for the purpose described.

GEORGE GUILD.

Witnesses:
SOLON C. KEMON,
H. J. ROBINSON.